(12) United States Patent
Dakshinkar et al.

(10) Patent No.: US 11,778,478 B2
(45) Date of Patent: Oct. 3, 2023

(54) OPPORTUNISTIC SPATIAL REUSE

(71) Applicant: HEWLETT PACKARD ENTERPRISE DEVELOPMENT LP, Houston, TX (US)

(72) Inventors: Abhiruchi Dakshinkar, Santa Clara, CA (US); Gaurav Patwardhan, Santa Clara, CA (US); Mohd Shahnawaz Siraj, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 43 days.

(21) Appl. No.: 17/505,348

(22) Filed: Oct. 19, 2021

(65) Prior Publication Data

US 2023/0121062 A1    Apr. 20, 2023

(51) Int. Cl.
*H04W 16/10* (2009.01)
*H04W 16/04* (2009.01)
*H04W 16/08* (2009.01)

(52) U.S. Cl.
CPC ........... *H04W 16/10* (2013.01); *H04W 16/04* (2013.01); *H04W 16/08* (2013.01)

(58) Field of Classification Search
CPC ..... H04W 16/10; H04W 16/04; H04W 16/08; H04W 16/14
See application file for complete search history.

(56) References Cited

U.S. PATENT DOCUMENTS

| | | | |
|---|---|---|---|
| 5,860,106 A | 1/1999 | Domen et al. | |
| 7,849,136 B2 | 12/2010 | Cho et al. | |
| 8,639,862 B2 | 1/2014 | Bouvier et al. | |
| 8,866,640 B2 | 10/2014 | Ganey et al. | |
| 10,418,023 B2 | 4/2019 | Jiang et al. | |
| 11,153,760 B2 * | 10/2021 | Silverman | H04W 16/14 |
| 2008/0153474 A1 | 6/2008 | Scott et al. | |
| 2009/0187911 A1 | 7/2009 | Martinez | |
| 2015/0058338 A1 | 2/2015 | Avrahami et al. | |
| 2017/0188376 A1 * | 6/2017 | Noh | H04B 7/0452 |
| 2018/0317233 A1 * | 11/2018 | Tsodik | H04W 16/14 |
| 2019/0236479 A1 | 8/2019 | Wagner et al. | |

(Continued)

FOREIGN PATENT DOCUMENTS

EP    3780676    2/2021

*Primary Examiner* — Shukri Taha
(74) *Attorney, Agent, or Firm* — Sheppard Mullin Richter & Hampton LLP

(57) ABSTRACT

Systems and methods are provided for opportunistic spatial reuse. In various embodiments, the disclosed systems and methods provide for mechanisms for enabling and disabling spatial reuse in a wireless network as appropriate based on the deployment of the wireless network. In some embodiments, spatial reuse can be enabled and disabled based on various factors, such as channel utilization. In some embodiments, spatial reuse can be enabled and disabled as appropriate for various types of traffic in a wireless network. For example, spatial reuse can be enabled and disabled for downlink traffic (e.g., traffic from an access point to a client device), for uplink traffic (e.g., traffic from a client device to an access point), for multicast or broadcast traffic (e.g., traffic distributed to multiple recipients), or for certain modes of transmission (e.g., single user beamformed transmission, Dual Carrier Modulated transmission).

15 Claims, 9 Drawing Sheets

(56) References Cited

U.S. PATENT DOCUMENTS

2021/0022156 A1\* 1/2021 Bhanage ............... H04W 88/08
2021/0360411 A1\* 11/2021 Yan ....................... H04W 16/02
2021/0360694 A1\* 11/2021 Pandian ................ H04W 24/02
2023/0013861 A1\* 1/2023 Patwardhan ...... H04W 52/0216

\* cited by examiner

OPPORTUNISTIC SPATIAL REUSE

BACKGROUND

Advances in computer technologies have led to increasing integration of computer technologies in various industries. For example, advances in wireless networking technologies have led to widespread proliferation of wireless electronic devices in various applications. While advances in wireless networking technologies have provided improvements in other technologies and industries, the increasing integration of wireless networking technologies in various industries has led to an increasing number of technological challenges in wireless networking technologies. For example, the widespread proliferation of wireless electronic devices has led to an increasing number of technological challenges in trying to accommodate the increasing number of users on wireless communication channels. A large number of users on a wireless communication channel may cause high levels of interference, which may degrade network performance for the users on the wireless communication channel. The Institute of Electrical and Electronics Engineers (IEEE) has issued various standards, such as the 802.11 standard to address various technological challenges arising in wireless networking technologies. Nevertheless, wireless networking technologies continue to face technological challenges as the use of wireless networking technologies continues to increase.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
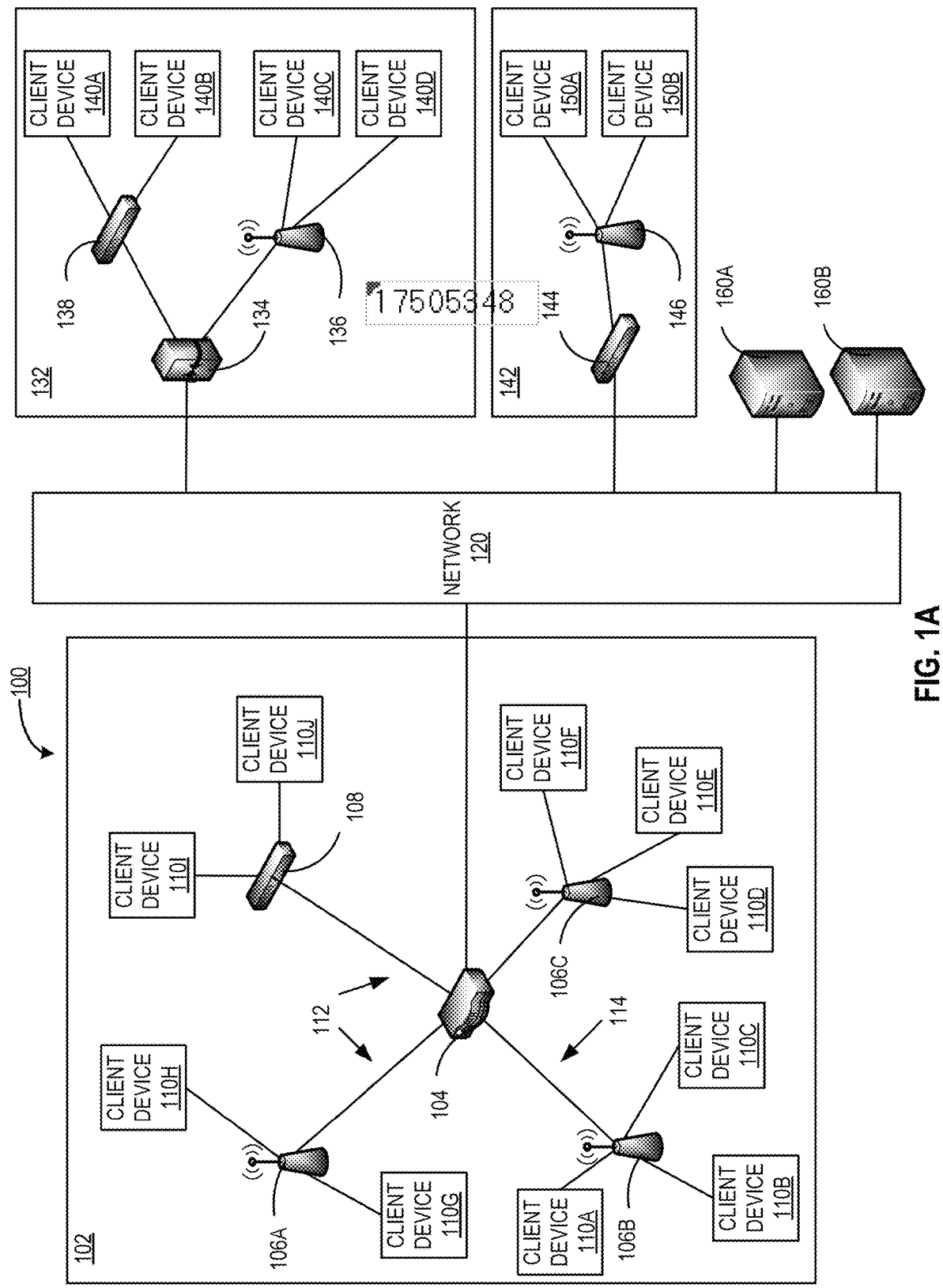
FIG. 1A illustrates one example of a wireless network deployment that may be implemented for an organization, such as a business, educational institution, governmental entity, healthcare facility or other organization.

The figures are not exhaustive and do not limit the present disclosure to the precise form disclosed.

DETAILED DESCRIPTION

Increased density in wireless networks, due in part to the widespread proliferation of wireless electronic devices, creates various technological challenges in the deployment of wireless networks. For example, increased density in wireless networks has created challenges associated with increased medium contention among wireless networks. Medium contention can occur when access points (APs) and client devices associated with different wireless networks use the same channel for communication and are close enough in physical proximity to hear (e.g., detect) each other on the same channel. When APs and client devices associated with different wireless networks can hear each other on the same channel, network performance of the different wireless networks can degrade significantly due to contention and collision.

Various approaches to improving wireless networking technologies are directed to facilitating parallel transmissions on the same channel and improving throughput in a wireless network. For example, overlapping basic service sets (OBSS) can refer to situations where multiple basic service sets, associated with different wireless networks, are provided through the same channel and connect APs and client devices that are close enough in physical proximity to hear each other physically. In situations such as these, basic service set (BSS) color schemes can provide for differentiation of basic service sets transmitted on the same channel. Furthermore, spatial reuse allows multiple devices associated with different BSSs on the same channel to transmit simultaneously if certain conditions, such as clear channel assessment (CCA) thresholds, are met. In general, spatial reuse involves distinguishing between inter-BSS and intra-BSS frames on the same channel based on their associated BSS colors. Depending on whether certain conditions, such as CCA thresholds, are met, an AP or client device may defer access to another AP or another client device.

Various approaches to spatial reuse are intended to increase total capacity of a channel by allowing simultaneous transmissions on the same channel. In one approach, spatial reuse can adapt CCA thresholds and adjust signal level thresholds to allow OBSSs to transmit simultaneously. This approach can involve manipulating transmit power. In this approach, spatial reuse relies on manipulating the transmit power to where a receiver can withstand some interference caused by a simultaneous transmission. The receiver can, accordingly, receive and decode packets simultaneously despite the interference. However, the advantages of this approach, and other approaches to spatial reuse, diminishes in large wireless deployments. In large wireless deployments, the use of spatial reuse may cause an increase in packet loss due to lower signal-to-interference-plus-noise ratio (SINR) caused by interference and lower transmit power. The increase in packet loss can lead to longer transmission times, which degrades overall network performance. This degradation in network performance is especially pronounced in various applications that rely on real-time traffic, such as voice applications, streaming applications, and gaming applications. Thus, the use of spatial reuse in large wireless deployments present technological challenges arising in the field of wireless networking technology.

Accordingly, disclosed are methods and systems for providing opportunistic spatial reuse. In various embodiments, the disclosed methods and systems provide for mechanisms for enabling and disabling spatial reuse in a wireless network as appropriate based on the deployment of the wireless network. In some embodiments, spatial reuse can be enabled and disabled based on various factors, such as channel utilization. An AP can determine the presence of at least one other AP using the same channel as the AP. The AP can determine a channel utilization of the channel based on traffic on the channel in relation to a capacity of the channel. The AP can enable spatial reuse if the channel utilization of the channel is within a threshold channel utilization range. The AP can disable spatial reuse if the channel utilization of the channel is outside the threshold channel utilization range. For example, a first AP can determine a presence of a second AP on the same channel as the first AP from a BSS broadcast by the second AP. The first AP can also determine a channel utilization of the channel shared with the second AP. For example, the first AP can determine that the channel utilization of the channel is 50%. In this example, the threshold channel utilization range for enabling spatial reuse can be from 30% to 70%. As the channel utilization of the channel is within the threshold channel utilization range for enabling spatial reuse, the first AP can enable spatial reuse. For example, the first AP can broadcast that spatial reuse is enabled for the channel. If the channel utilization of the channel exceeds the threshold channel utilization range or falls below the threshold channel utilization range, the first AP can disable spatial reuse. For example, the first AP can broadcast that spatial reuse is disabled for the channel. By enabling and disabling spatial reuse based on channel utilization, spatial reuse can be advantageously utilized in large wireless deployments while avoiding degradation in network performance.

In some embodiments, spatial reuse can be enabled and disabled as appropriate for various types of traffic in a wireless network. For example, spatial reuse can be enabled and disabled for downlink traffic (e.g., traffic from an AP to a client device), for uplink traffic (e.g., traffic from a client device to an AP), for multicast or broadcast traffic (e.g., traffic distributed to multiple recipients), or for certain modes of transmission (e.g., single user beamformed transmission, dual carrier modulated (DCM) transmission). Certain modes of transmission can be considered robust in that they are less susceptible to interference due to parallel transmissions and are more likely to maintain their integrity in the presence of interference. APs in a wireless network deployment can communicate with each other, for example, using an out of band frequency, and enable spatial reuse for a certain type of traffic. For example, APs in a wireless network can communicate with each other to enable spatial reuse for downlink traffic and disable spatial reuse for uplink traffic. To enable spatial reuse for downlink traffic, the APs can communicate with each other to enable spatial reuse for traffic from the APs. To disable spatial reuse for uplink traffic, the APs can broadcast to client devices that spatial reuse is disabled. In this example, spatial reuse for uplink traffic is disabled because the client devices operate as if spatial reuse is disabled and not use spatial reuse when transmitting. At the same time, spatial reuse for downlink traffic is enabled because the APs operate as if spatial reuse is enabled and use spatial reuse when transmitting. By enabling and disabling spatial reuse for certain types of traffic in a wireless network, spatial reuse can be advantageously utilized in large wireless deployments for traffic associated with prioritized applications. Thus, the disclosed methods and systems for opportunistic spatial reuse provide for improved wireless network performance in large wireless deployments, as further described herein.

Before describing embodiments of the disclosed systems and methods in detail, it may be useful to describe an example network installation with which these systems and methods might be implemented in various applications. FIG. 1A illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless access points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110*a-h*. In the illustrated example, APs 106*a-c* can be managed and configured by the controller 104. APs 106*a-c* communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1A may be, for example, a satellite office, another floor, or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140*a-d*.

In various embodiments, the remote site 132 may be in direct communication with primary site 102, such that client devices 140*a-d* at the remote site 132 access the network resources at the primary site 102 as if these client devices 140*a-d* were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150*a-b* access the network 120. Such a remote site 142 may represent, for example, an individual employee's home or a temporary remote office. The remote site 142 may also be in communication with the primary site 102, such that the client devices 150*a-b* at remote site 142 access network resources at the primary site 102 as if these client devices 150*a-b* were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160*a-b*. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160*a-b*. Content servers 160*a-b* may include various providers of multimedia downloadable and/or streaming content, including audio, video, graphical, and/or text content, or any combination thereof. Examples of content servers 160*a-b* include, for example, web servers, streaming radio and video providers, and cable and satellite television providers. The client devices 110*a-j*, 140*a-d*, 150*a-b* may request and access the multimedia content provided by the content servers 160*a-b*.

Although only 10 client devices 110*a-j* are illustrated at primary site 102 in the example of FIG. 1A, in various applications, a network may include dramatically larger quantities of client devices. For example, various wireless networks, such as in large wireless deployments, may include hundreds, thousands, or even tens of thousands of client devices communicating with their respective APs, potentially at the same time. Furthermore, as there is a finite number of available wireless channels with which to communicate, these client devices communicating with their respective APs may attempt to use the same wireless channels at the same time. As noted above, communicating with the same wireless channels can lead to medium contention as client devices and APs may contend for use of the wireless channels. The use of various wireless communication techniques, such as the spatial reuse techniques described herein, may cause degradation in network performance due to interference and packet loss if not used in a manner appropriate for the wireless network. As further described herein, by enabling and disabling spatial reuse as appropriate for a wireless network, degradation in network performance due to interference and packet loss can be avoided. Furthermore, the use of opportunistic spatial reuse techniques as described herein can increase throughput of the wireless channel, improving overall performance.

Figure 1B:
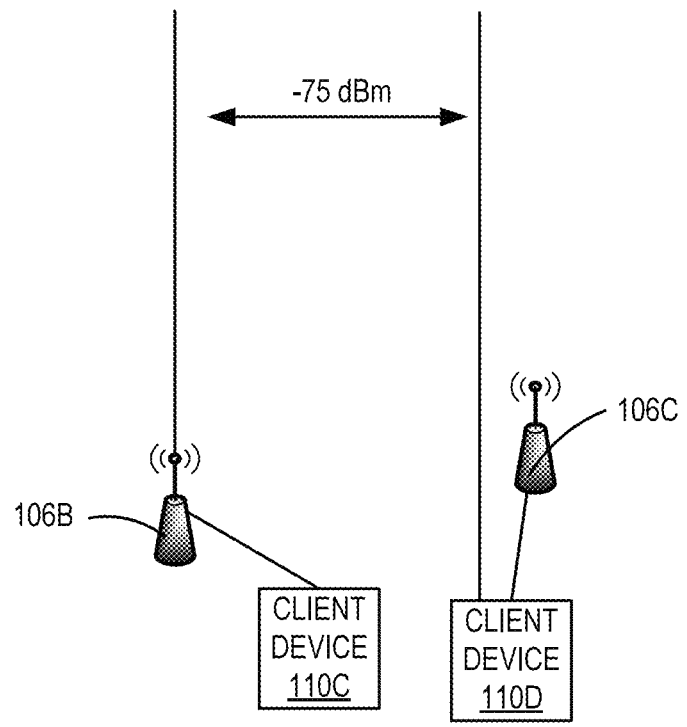
FIG. 1B illustrates an example of a spatial reuse scenario.

FIG. 1B illustrates an example of intra-BSS communication that may cause inter-BSS/OBSS interference in the context of the example network 100 illustrated in FIG. 1A. In the example of FIG. 1B, client device 110*c* (associated with AP 106*b*) may be transmitting data on a particular channel while client device 110*d* (associated to AP 106*c*) may also be operating on the same channel. Because client devices 110*c* and 110*d* are physically close to each other, they may be able to hear (e.g., detect) transmissions from each other above their packet detect (PD) thresholds, despite belonging to different BSSs. Because the respective PD thresholds of client devices 110*c*, 110*d* are being triggered by the transmissions from each other, client devices 110*c*, 110*d* are in contention with each other. Accordingly, client devices 110*c*, 110*d* will take turns accessing the channel, with each client device getting approximately half the available bandwidth and throughput of the channel, but they will not necessarily interfere with each other. That is, transmissions from client device 110*c* energy is not considered to be interference by AP 106*c* as it is too far away, while transmissions from client device 110*d* is not powerful enough to be heard by AP 106*b*, but client devices 110*c*, 110*d* are close enough to interfere, and so are prevented from transmitting simultaneously on the channel. It should be understood that the above is only an example, and that inter-BSS/OBSS interference can occur between other network devices, such as between two APs, or between an AP and a client device.

However, with spatial reuse, client devices 110*c*, 110*d* can coordinate with one another and can be allowed to transmit data at the same time with a high likelihood of success because AP 106*b* cannot hear client device 110*d*, and AP 106*c* cannot hear client device 110*c*. Thus, neither of APs 106*b*, 106*c* experiences interference from each other. The coordination comes about from the recognition (on a packet-by-packet basis) where a packet belongs to one BSS or another BSS. This determination can be accomplished using BSS coloring. It should be understood that the "color" is an index number (e.g., from 1 to 63) assigned to individual APs along with channel assignment, whether manually, through self-automated determination, or through external automated determination and assignment. When APs share the same channel and are in the same vicinity, they may have different BSS colors. When two BSSs operating on the same channel have the same BSS color, a condition referred to as color collision occurs.

In some cases, spatial reuse allows for adjustments to the PD threshold to be made between a minimum of −82 dBm and a maximum of −62 dBm, modifying the signal detection threshold window to take advantage of an SR opportunity. The amount of adjustment allowed may be determined by the transmit power used. Lowering the transmit power can reduce the potential for interference. A lower transmit power may also reduce the data rate, which may be balanced by increased transmit opportunities. As noted above, the advantages of spatial reuse diminish in large wireless deployments. This can be attributed to low signal-to-interference-plus-noise ratio (SINR) from interference and lower transmit power. Thus, in order to realize the advantages of spatial reuse in large wireless deployments, the disclosed methods and systems provide for mechanisms for enabling and disabling spatial reuse in a wireless network as appropriate based on the deployment of the wireless network.

Figure 2:
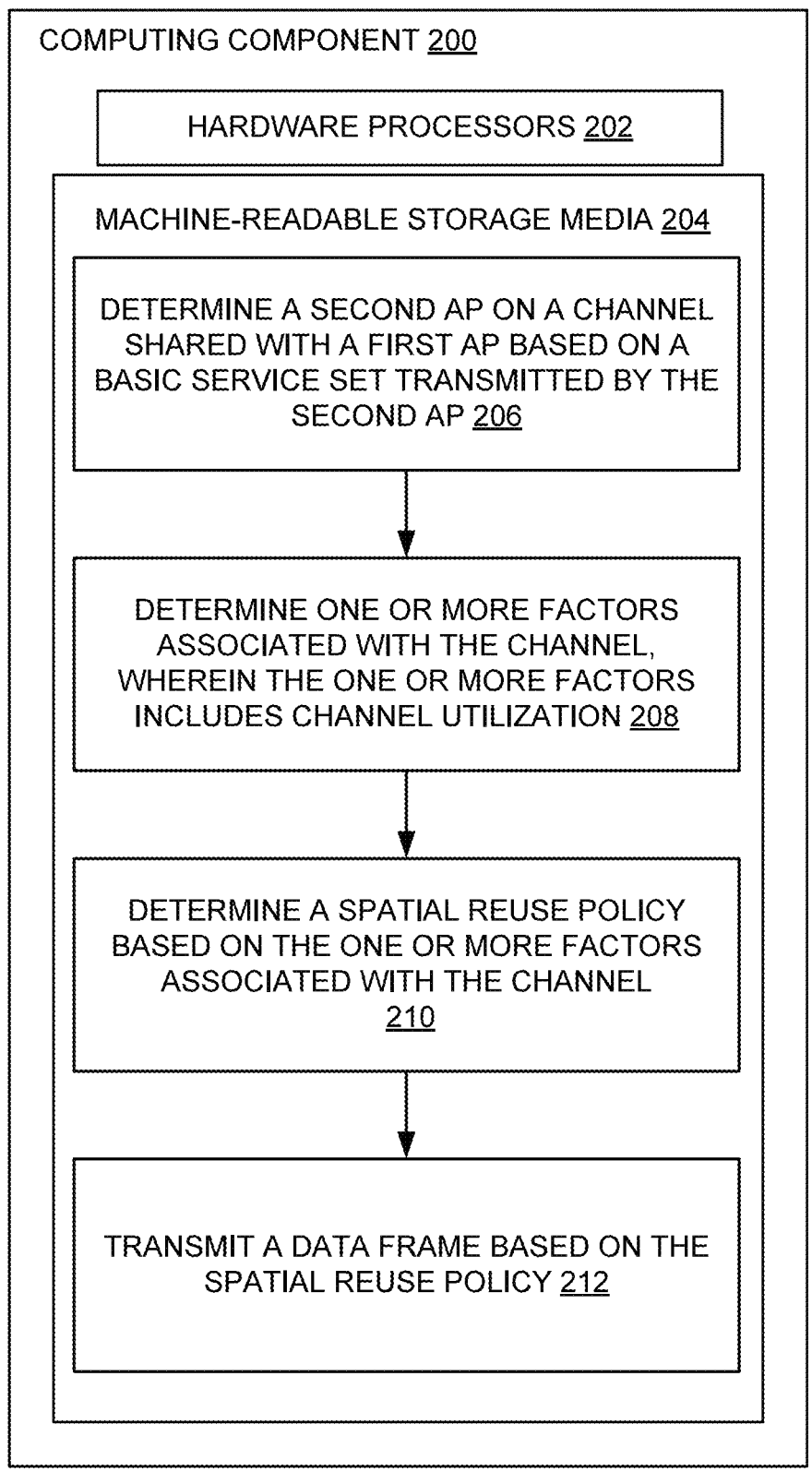
FIG. 2 illustrates a block diagram of an example computing component or device associated with opportunistic spatial reuse.

FIG. 2 illustrates an example computing component 200 that may be used to implement opportunistic spatial reuse in accordance with various embodiments. The example computing component 200 may be, for example, an access point (AP), a server computer, a controller, or any other similar computing component capable of processing data. In the example implementation of FIG. 2, the computing component 200 includes a hardware processor 202, and machine-readable storage medium 204.

Hardware processor 202 may be one or more central processing units (CPUs), semiconductor-based microprocessors, and/or other hardware devices suitable for retrieval and execution of instructions stored in machine-readable storage medium 204. Hardware processor 202 may fetch, decode, and execute instructions, such as instructions 206-212, to control processes or operations for opportunistic spatial reuse. As an alternative or in addition to retrieving and executing instructions, hardware processor 202 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 204, may be any electronic, magnetic, optical, or other physical storage device that contains or stores executable instructions. Thus, machine-readable storage medium 204 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 204 may be a non-transitory storage medium, where the term "non-transitory" does not encompass transitory propagating signals. As described in detail below, machine-readable storage medium 204 may be encoded with executable instructions, for example, instructions 206-212.

Hardware processor 202 may execute instruction 206 to determine a second AP on a channel shared with a first AP based on a basic service set (BSS) transmitted by the second AP. In various embodiments, an AP periodically broadcasts a BSS that provides information for other devices within a proximity (e.g., basic service area) of the AP to connect with the AP and communicate with the AP. The AP can broadcast its capabilities to the other devices within the proximity. The devices can connect to the AP and communicate with the AP based on the broadcasted capabilities. For example, an AP can broadcast information regarding a wireless channel and a BSS color for communicating with the AP. In various embodiments, an AP can identify other APs within a proximity of the AP based on BSSs broadcast by the other APs. The AP can determine what channels the other APs are using for communication. In some cases, multiple APs can use the same channel for communication. As described above, if multiple APs are using the same channel for communication, then medium contention can occur. In such cases, the APs can coordinate with each other, through wireless communication on the channel or the like, to enable and disable spatial reuse as appropriate for the situation. In some cases, the APs can communicate using an out-of-band frequency to coordinate enabling and disabling spatial reuse.

For example, a wireless network, such as the network configuration illustrated in FIG. 1A, can include a first AP and a second AP. The first AP in the wireless network can receive a beacon transmitted by a second AP. The beacon transmitted by the second AP can provide various information associated with the second AP. Based on the beacon, the first AP can determine that the second AP is operating on the same channel as the first AP. In this example, the first AP may also determine from the beacon that the second AP has similar capabilities as the first AP (e.g., they are from the same product family). These similar capabilities can include the capability to communicate using an out-of-band mechanism to coordinate enabling and disabling spatial reuse. The first AP can communicate with the second AP using the out-of-band mechanism to coordinate enabling and disabling spatial reuse as appropriate for the wireless network.

Hardware processor 202 may execute instruction 208 to determine one or more factors associated with the channel, wherein the one or more factors includes channel utilization. In various embodiments, an AP can determine various factors associated with a wireless network. The factors can include, for example, a number of APs using a channel, channel utilization of the channel, an amount of traffic on the channel, a capacity of the channel, a type of traffic on the channel, a direction of traffic on the channel, and a mode of transmission on the channel. Types of traffic on a channel can include, for example, video traffic, voice traffic, broadcast traffic, multicast traffic, and the like. Directions of traffic on a channel can include, for example, uplink traffic, downlink traffic, and the like. Modes of transmission on a channel can include, for example, beamformed transmission, multi-user, multiple-input, multiple-output (MU-MIMO) transmission, dual carrier modulated (DCM) transmission, and the like. For example, an AP can measure channel utilization of a channel based on an amount of traffic on the channel and a capacity of the channel. Channel utilization can be a percentage, a ratio, or a fraction of the channel capacity being used. For example, if the amount of traffic on the channel is half of the capacity of the channel, then the channel utilization of the channel can be 50%. In some cases, various factors associated with a wireless network can be determined from information in a preamble or in a header associated with a data frame transmitted on the wireless network. For example, a data frame can have a high efficiency signal (HE-SIG-A) field that includes various information associated with the data frame. In the HE-SIG-A field, the second bit, for example, can indicate whether the frame is an uplink transmission or a downlink transmission. The second bit can be set to one to indicate that the frame is an uplink transmission, or the second bit can be set to zero to indicate that the frame is a downlink transmission. A determination of whether to enable or disable spatial reuse for a channel can be based on these various factors.

For example, a wireless network, such as the network configuration illustrated in FIG. 1A, can include a first AP and a second AP. The first AP and the second AP can operate on the same channel in the wireless network. The first AP can measure channel utilization of the channel based on an amount of traffic on the channel and a capacity of the channel. For example, the first AP can measure the amount of traffic facilitated by the first AP and the second AP in the wireless network. The first AP can determine the capacity of the channel based on, for example, the frequency band of the channel and the total throughput of the channel. Based on the amount of traffic measured by the first AP and the capacity of the channel determined by the first AP, the channel utilization of the channel can be determined. In this example, the first AP can make a determination of whether to enable or disable spatial reuse for the channel be based on the channel utilization.

Hardware processor 202 may execute instruction 210 to determine a spatial reuse policy based on the one or more factors associated with the channel. In various embodiments, a spatial reuse policy for enabling and disabling spatial reuse for a wireless network can be determined based on various factors associated with the wireless network. In general, spatial reuse for a channel can be disabled when there is only one AP using the channel on a wireless network. In some embodiments, a spatial reuse policy can include enabling and disabling spatial reuse for a channel based on a channel utilization of the channel. Spatial reuse can be enabled for the channel if the channel utilization is within a threshold channel utilization range. Spatial reuse can be disabled for the channel if the channel utilization is outside the threshold channel utilization range. In some cases, enabling spatial reuse can contribute to the channel utilization. In such cases, spatial reuse can be enabled when channel utilization falls within a first threshold channel utilization range associated with enabling spatial reuse. Spatial reuse can be disabled when channel utilization, with spatial reuse enabled, is outside a second threshold channel utilization range associated with disabling spatial reuse. In some cases, a delay timer can be used to add a delay between enabling spatial reuse and delaying spatial reuse. Adding a delay between the enabling and disabling of spatial reuse can provide hysteresis to the wireless network and dampen any cascading effect that may result from the enabling and disabling of spatial reuse. Spatial reuse can be enabled for a channel based on a broadcast from an AP on the channel to enable spatial reuse. Similarly, spatial reuse can be disabled for the channel based on a broadcast from the AP to disable spatial reuse.

For example, a wireless network, such as the network configuration illustrated in FIG. 1A, can include a first AP and a second AP operating on the same channel in the wireless network. A spatial reuse policy can be implemented for the channel based on channel utilization of the channel. The first AP can measure channel utilization of the channel and determine, for example, that the channel utilization (e.g., 50%) is within a first threshold channel utilization range (e.g., 30%-60%) for enabling spatial reuse. The first AP can enable spatial reuse for the channel by broadcasting to the devices on the channel that spatial reuse is enabled. In this example, the channel utilization may increase. The first AP can measure the channel utilization of the channel and determine, for example, that the channel utilization (e.g., 80%) is outside a second threshold channel utilization range (e.g., 30%-70%) for disabling spatial reuse. The first AP can disable spatial reuse for the channel by broadcasting to the devices on the channel that spatial reuse is disabled. By enabling and disabling spatial reuse based on channel utilization, spatial reuse can be utilized to increase throughput on a channel while avoiding situations where spatial reuse may cause degradation in network performance.

In some embodiments, a spatial reuse policy can include enabling and disabling spatial reuse for uplink traffic or for downlink traffic. In some cases, certain traffic in a wireless network may be of a higher priority than other traffic in the wireless network. For example, in an airport where downloading of flight information is a priority over other traffic, downlink traffic may be prioritized over uplink traffic. Whether a frame is sent in uplink or in downlink can be identified in a preamble or a header associated with the frame. For example, the HE-SIG-A field of a frame contains a bit that indicates whether the frame is sent in uplink or in downlink. A frame can be transmitted using spatial reuse based on whether it is identified as uplink traffic or as downlink traffic. For a channel in a wireless network, spatial reuse can be enabled for uplink traffic by broadcasting to devices on the channel that spatial reuse is enabled. APs on the channel can disable transmission using spatial reuse from the APs, which prevents spatial reuse for downlink traffic. Similarly, for a channel in a wireless network, spatial reuse can be enabled for downlink traffic by broadcasting to devices on the channel that spatial reuse is disabled, which prevents spatial reuse for uplink. APs on the channel can enable transmission using spatial reuse from the APs, which enables downlink spatial reuse.

For example, a wireless network, such as the network configuration illustrated in FIG. 1A, can include a first AP and a second AP operating on the same channel in the wireless network. A spatial reuse policy can be implemented for the channel to enable spatial reuse for downlink traffic. The first AP can communicate with the second AP to enable spatial reuse for downlink traffic and disable spatial reuse for uplink traffic. The first AP and the second AP can broadcast to client devices on the channel that spatial reuse is disabled. Accordingly, the client devices on the channel will not use spatial reuse for their transmissions, which prevents spatial reuse for uplink traffic. The first AP can communicate with the second AP to use spatial reuse for transmissions from the first AP and the second AP, which enables spatial reuse for downlink traffic. By enabling and disabling spatial reuse for uplink traffic or downlink traffic, spatial reuse can be utilized to increase throughput on a channel for prioritized traffic while avoiding degradation in network performance caused by spatial reuse for lower priority traffic.

In some embodiments, a spatial reuse policy can include enabling and disabling spatial reuse for multicast transmissions or broadcast transmissions. In some cases, multicast transmissions or broadcast transmissions may be prioritized as multiple devices would be impacted if multicast frames or broadcast frames were dropped. In general, multicast frames and broadcast frames are not identified in the frame. However, multicast frames and broadcast frames are generally transmitted at certain time periods (e.g., after a delivery traffic indication message (DTIM) beacon). In some cases, a spatial reuse policy can protect multicast transmissions and broadcast transmissions from potential interference or packet loss from spatial reuse by reserving a time period when spatial reuse is disabled. Spatial reuse can be enabled for transmissions outside the reserved time period. For example, APs on a shared channel can communicate to reserve a time period, such as after a DTIM beacon to disable spatial reuse. During the time period, multicast transmissions and broadcast transmissions can be made without spatial reuse. Spatial reuse can be disabled during the multicast transmissions and broadcast transmissions, for example, by setting appropriate bits corresponding to spatial reuse (e.g., bits 15-18 in a HE-SIG-A field) in the multicast transmissions and broadcast transmissions. Spatial reuse can be enabled following the time period and disabled again at a subsequent time period reserved for multicast transmissions and broadcast transmissions.

For example, a wireless network, such as the network configuration illustrated in FIG. 1A, can include a first AP and a second AP operating on the same channel in the wireless network. A spatial reuse policy can be implemented for the channel to reserve a time period for multicast transmissions when spatial reuse is disabled. For example, the time period can follow periodic DTIM beacons broadcast by the first AP and the second AP. In accordance with the spatial reuse policy, the first AP and the second AP can disable spatial reuse during the time period. Transmissions during the time period, which generally include multicast transmissions, are sent with spatial reuse disabled. Following the time period, the first AP and the second AP can enable (or re-enable) spatial reuse. Transmissions following the time period, which generally do not include multicast transmissions, are sent with spatial reuse enabled. The time period when spatial reuse is disabled can be periodic, so multicast transmissions sent at regular intervals are sent without spatial reuse. By enabling and disabling spatial reuse for multicast transmissions or broadcast transmissions, spatial reuse can be utilized to increase throughput on a channel while protecting multicast transmissions and broadcast transmissions from potential interference and packet loss that may be caused by spatial reuse.

In some embodiments, a spatial reuse policy can include enabling and disabling spatial reuse for certain modes of transmission. In some cases, certain modes of transmission, such as beamformed transmission and dual carrier modulated (DCM) transmission, can be considered more robust and less susceptible to interference and packet loss that may be caused by spatial reuse. In these cases, spatial reuse can be enabled for transmissions that involve such robust modes of transmissions. In general, a mode of transmission for a frame can be indicated in a preamble or header associated with the frame. Spatial reuse can be enabled for the frame based on the mode of transmission indicated in the preamble or the header associated with the frame.

For example, a wireless network, such as the network configuration illustrated in FIG. 1A, can include a first AP and a second AP operating on the same channel in the wireless network. A spatial reuse policy can be implemented for the channel to enable spatial reuse for DCM frames. In accordance with the spatial reuse policy, the first AP and the second AP can receive DCM frames and enable spatial reuse for transmission of the DCM frames. The first AP and the second AP can disable reuse for transmissions associated with other modes of transmission. By enabling and disabling spatial reuse for certain modes of transmission, spatial reuse can be utilized to increase throughput on a channel for robust traffic that is more resistant to interference and packet loss while avoiding degradation in network performance caused by spatial reuse for less robust traffic that is less resistant to interference and packet loss.

Hardware processor 202 may execute instruction 212 to transmit a data frame based on the spatial reuse policy. In various embodiments, a data frame can be transmitted in parallel with another data frame using spatial reuse or a data frame can be transmitted with spatial reuse disabled. For example, as described with respect to FIG. 1B, transmission with spatial reuse enabled can involve transmission of a first data frame in parallel with a second data frame. The second data frame can be transmitted with a reduced transmit power to reduce the potential for interference with the first data frame. To transmit a data frame with spatial reuse disabled, a device, such an AP waits for a channel to be free (e.g., no other devices are transmitting on the channel) to transmit the data frame.

Figure 3:
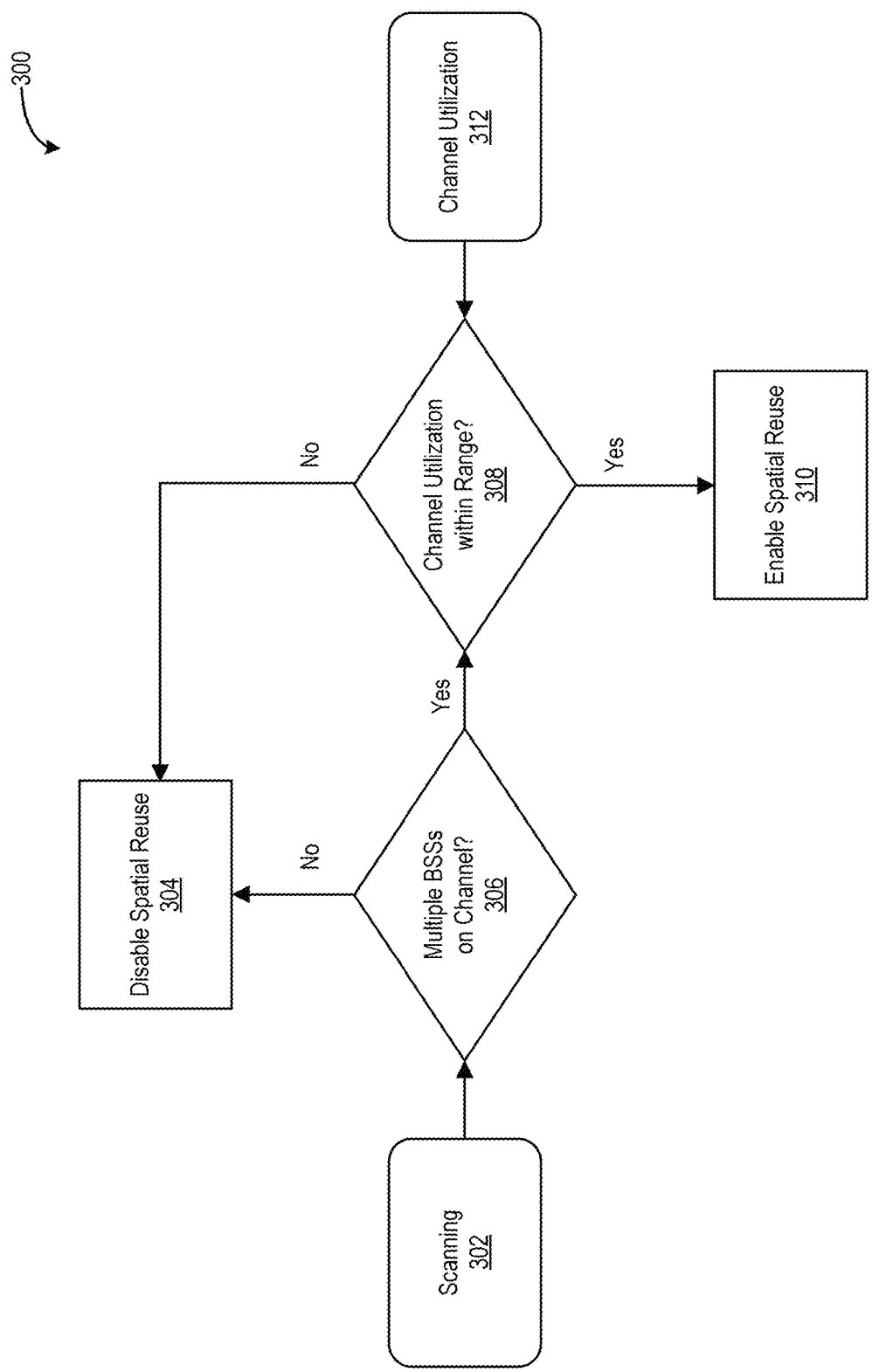
FIG. 3 illustrates an example flow chart associated with opportunistic spatial reuse.

FIG. 3 illustrates an example flow 300 associated with opportunistic spatial reuse. The example flow 300 can be associated with one or more functions performed by, for example, the example computing component 200 of FIG. 2. It should be understood that there can be additional, fewer, or alternative steps performed in similar or alternative orders, or in parallel, based on the various features and embodiments discussed herein unless otherwise stated.

As illustrated in FIG. 3, the example flow 300 depicts steps associated with enabling spatial reuse and disabling spatial reuse based on channel utilization of a channel. At step 302, the example flow 300 involves a scanning function. The scanning function can involve scanning a channel for access points (APs). As described herein, a channel can be scanned for APs based on, for example, basic service sets (BSSs) transmitted by the APs. At step 312, the example flow 300 involves a channel utilization function. The channel utilization function can involve measuring an amount of traffic on a channel and, based on the amount of traffic and a capacity of the channel, determine a channel utilization of the channel. At step 306, the example flow 300 involves determining multiple BSSs on a channel. If there are not multiple BSSs on the channel, the example flow 300, at step 304, disables spatial reuse for the channel. If there are multiple BSSs on the channel, the example flow 300, at step 308, determines whether the channel utilization is within range. The range can be, for example, a threshold channel utilization range associated with enabling spatial reuse. If the channel utilization is within the range (and there are multiple BSSs on the channel), the example flow 300, at step 310, enables spatial reuse for the channel. If the channel utilization is not within the range, the example flow 300, at step 304, disables spatial reuse for the channel.

FIGS. 4A-4D illustrate example flows associated with opportunistic spatial reuse. The example flows can be associated with one or more functions performed by, for example, the example computing component 200 of FIG. 2. It should be understood that there can be additional, fewer, or alternative steps performed in similar or alternative orders, or in parallel, based on the various features and embodiments discussed herein unless otherwise stated.

Figure 4A:
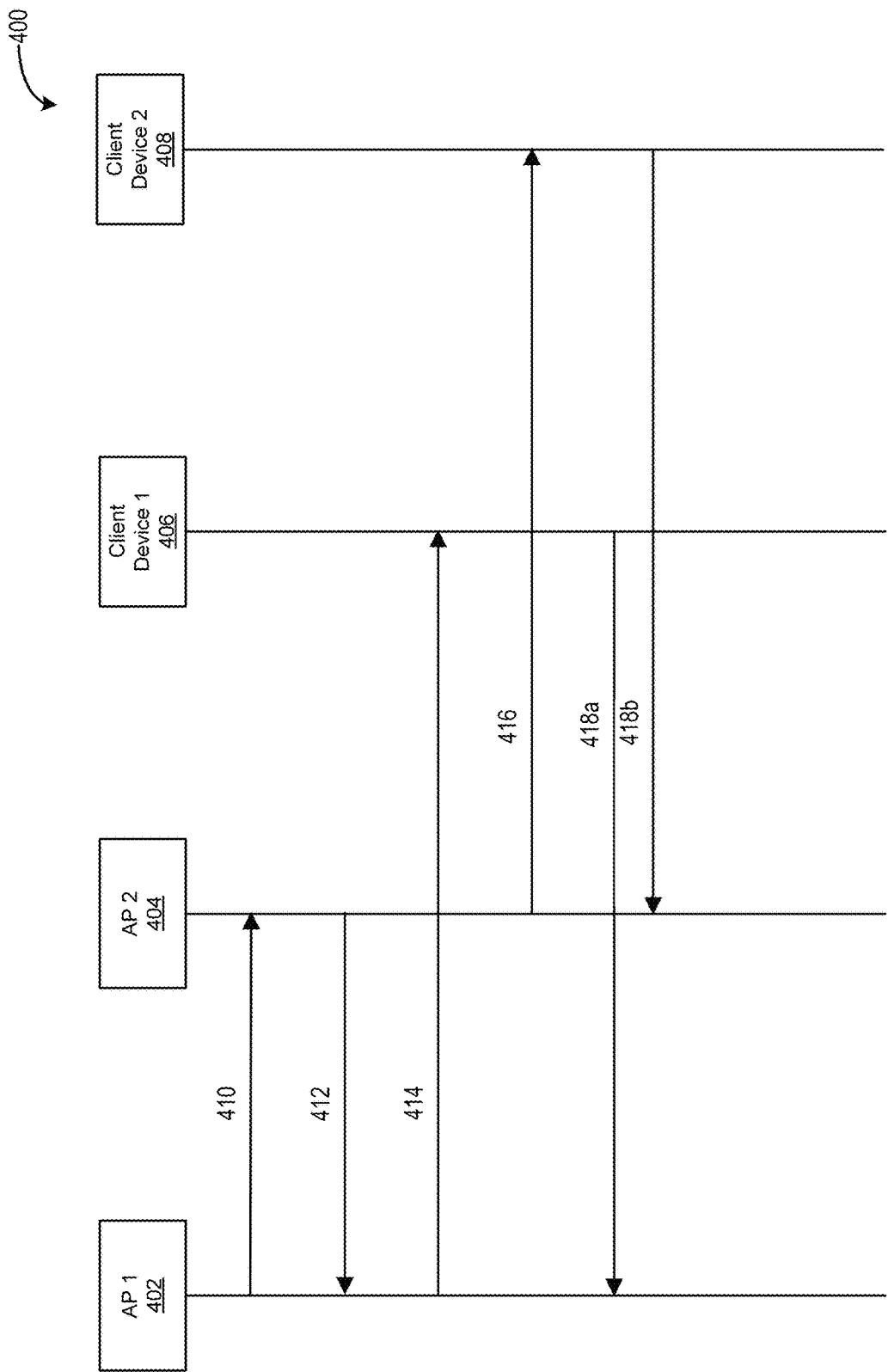
FIGS. 4A-4D illustrate example flow charts associated with opportunistic spatial reuse.

FIG. 4A illustrates an example flow 400 associated with enabling spatial reuse for uplink traffic. As illustrated in FIG. 4A, the example flow 400 involves a first access point (AP) 402, a second AP 404, a first client device 406, and a second client device 408. At step 410, the first AP 402 broadcasts a basic service set (BSS) that allows the second AP 404 to determine that the first AP 402 is using the same channel as the second AP 404. The second AP 404 may also broadcast a BSS that allows the first AP 402 to determine that the second AP 404 is using the same channel as the first AP 402. At step 412, the second AP 404 communicates a spatial reuse policy with the first AP 402. The spatial reuse policy, in this example, can involve enabling spatial reuse for uplink traffic and disabling spatial reuse for downlink traffic. To implement the spatial reuse policy, the first AP 402 and the second AP 404 will not use spatial reuse for transmissions from the first AP 402 and from the second AP 404. At step 414, the first AP 402 can broadcast to the first client device 406 (and other client devices associated with the first AP 402) that spatial reuse is enabled. At step 416, the second AP 404 can broadcast to the second client device 408 (and other client devices associated with the second AP 404) that spatial reuse is enabled. At step 418a, the first client device 406 can transmit a first data frame with spatial reuse enabled. At step 418b, the second client device 408 can transmit a second data frame, in parallel with the first data frame, with spatial reuse enabled.

Figure 4B:
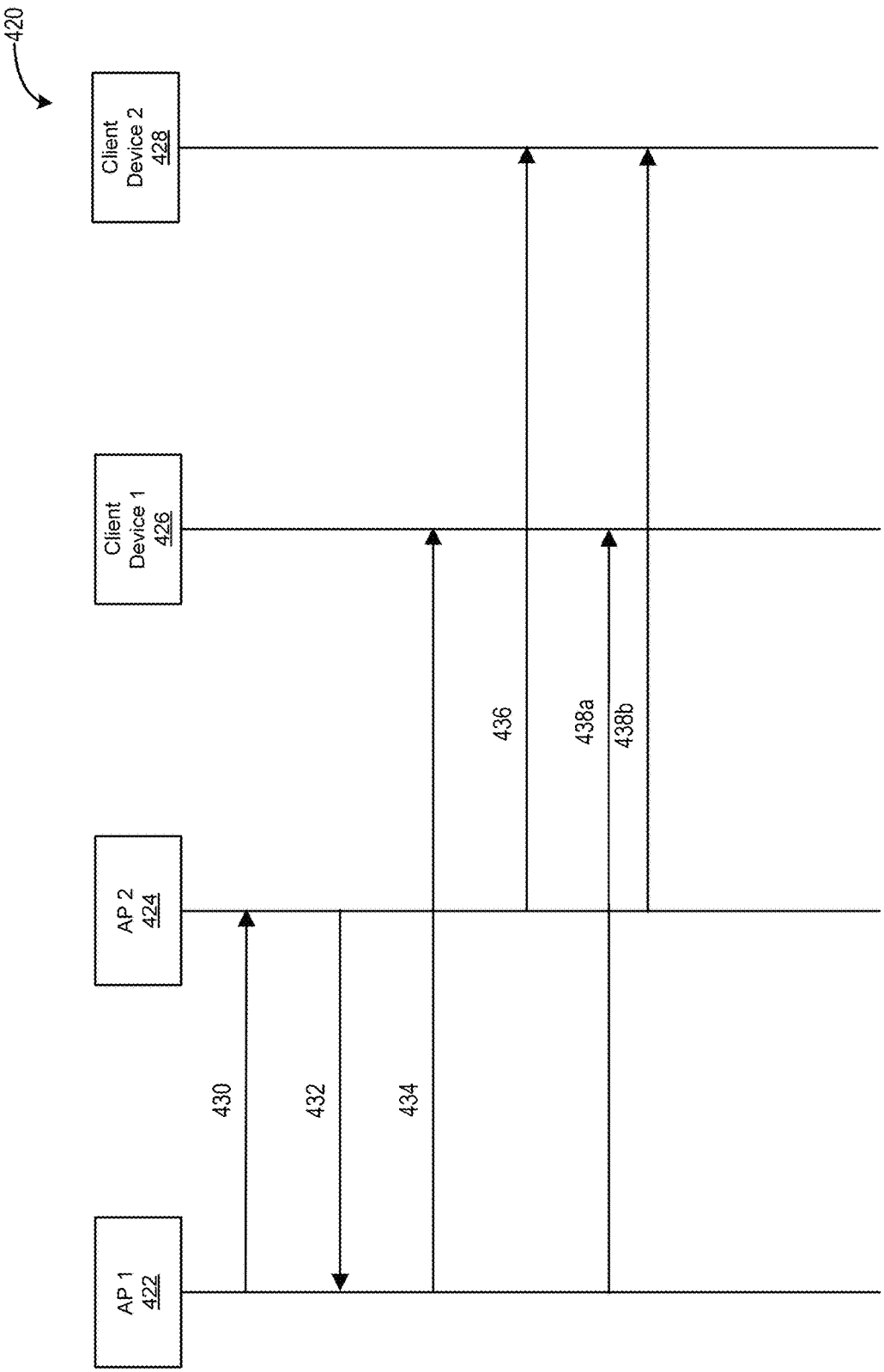

FIG. 4B illustrates an example flow 420 associated with enabling spatial reuse for downlink traffic. As illustrated in FIG. 4B, the example flow 420 involves a first AP 422, a second AP 424, a first client device 426, and a second client device 428. At step 430, the first AP 422 broadcasts a BSS that allows the second AP 424 to determine that the first AP 422 is using the same channel as the second AP 424. The second AP 424 may also broadcast a BSS that allows the first AP 422 to determine that the second AP 424 is using the same channel as the first AP 422. At step 432, the second AP 424 communicates a spatial reuse policy with the first AP 422. The spatial reuse policy, in this example, can involve enabling spatial reuse for downlink traffic and disabling spatial reuse for uplink traffic. To implement the spatial reuse policy, the first AP 422 and the second AP 424 will use spatial reuse for transmissions from the first AP 422 and from the second AP 424. At step 434, the first AP 422 can broadcast to the first client device 426 (and other client devices associated with the first AP 422) that spatial reuse is disabled. At step 436, the second AP 424 can broadcast to the second client device 428 (and other client devices associated with the second AP 424) that spatial reuse is disabled. Accordingly, the first client device 426 and the second client device 428 will not use spatial reuse in their transmissions to the first AP 422 and the second AP 424. At step 438a, the first AP 422 can transmit a first data frame with spatial reuse enabled. At step 438b, the second AP 424 can transmit a second data frame, in parallel with the first data frame, with spatial reuse enabled.

Figure 4C:
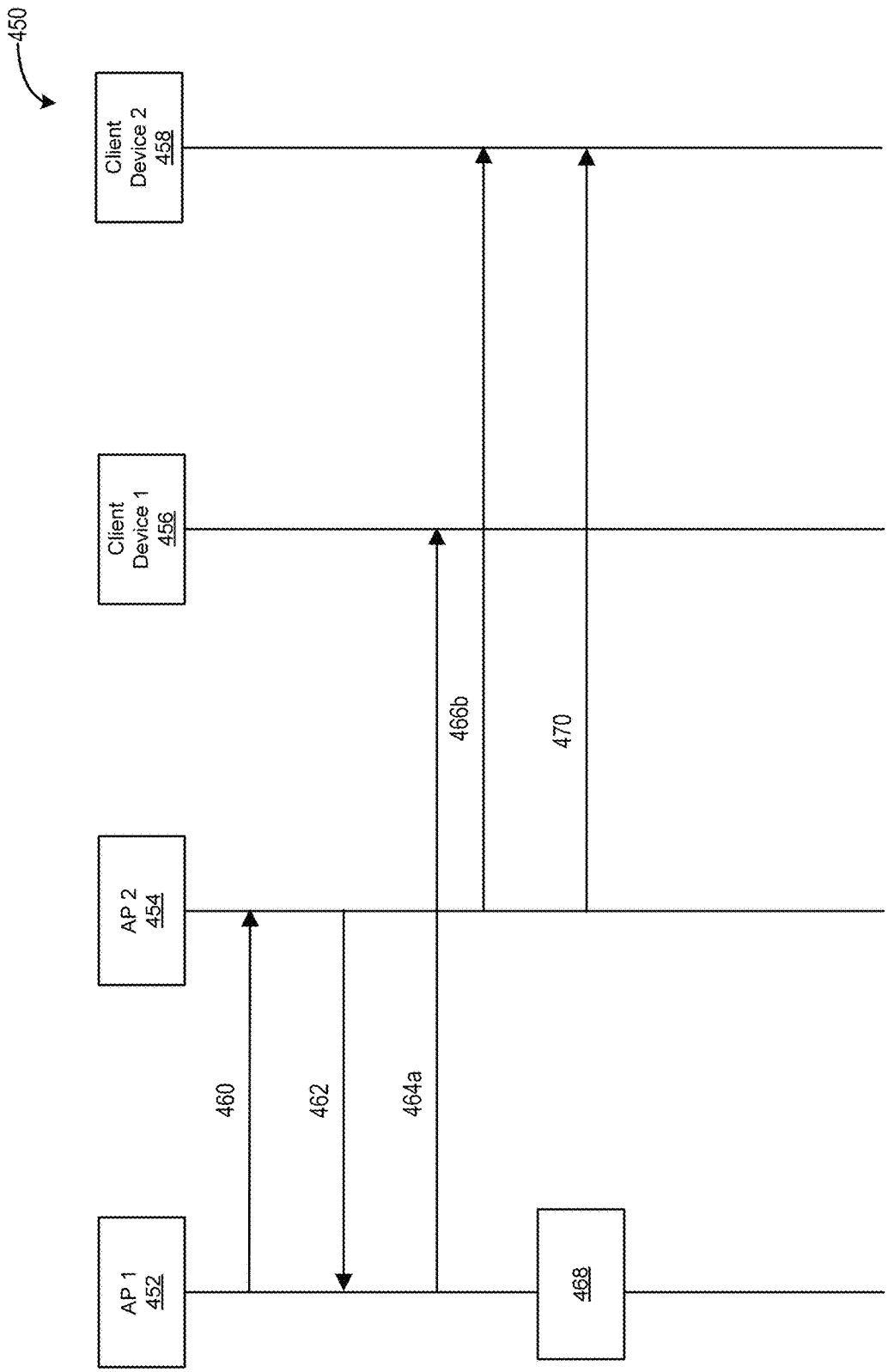

FIG. 4C illustrates an example flow 450 associated with disabling spatial reuse for multicast traffic. As illustrated in FIG. 4A, the example flow 450 involves a first AP 452, a second AP 454, a first client device 456, and a second client device 458. At step 460, the first AP 452 broadcasts a BSS that allows the second AP 454 to determine that the first AP 452 is using the same channel as the second AP 454. The second AP 454 may also broadcast a BSS that allows the first AP 452 to determine that the second AP 454 is using the same channel as the first AP 452. At step 462, the second AP 454 communicates a spatial reuse policy with the first AP 452. The spatial reuse policy, in this example, can involve disabling spatial reuse for multicast traffic. To implement the spatial reuse policy, the first AP 452 and the second AP 454 will disable spatial reuse for transmissions from the first AP 452 and from the second AP 454 for a time period associated with when multicast traffic is generally transmitted. At step 464a, prior to the time period, the first AP 452 can transmit a first data frame with spatial reuse enabled. At step 464b, the second AP 454 can transmit a second data frame, in parallel with the first data frame, with spatial reuse enabled. At step 468, the first AP 452 can disable spatial reuse and allow the channel to be free for multicast traffic to be transmitted without spatial reuse. At step 470, the second AP 454 can transmit a multicast frame to a multicast address that is received by the second client device 458.

Figure 4D:
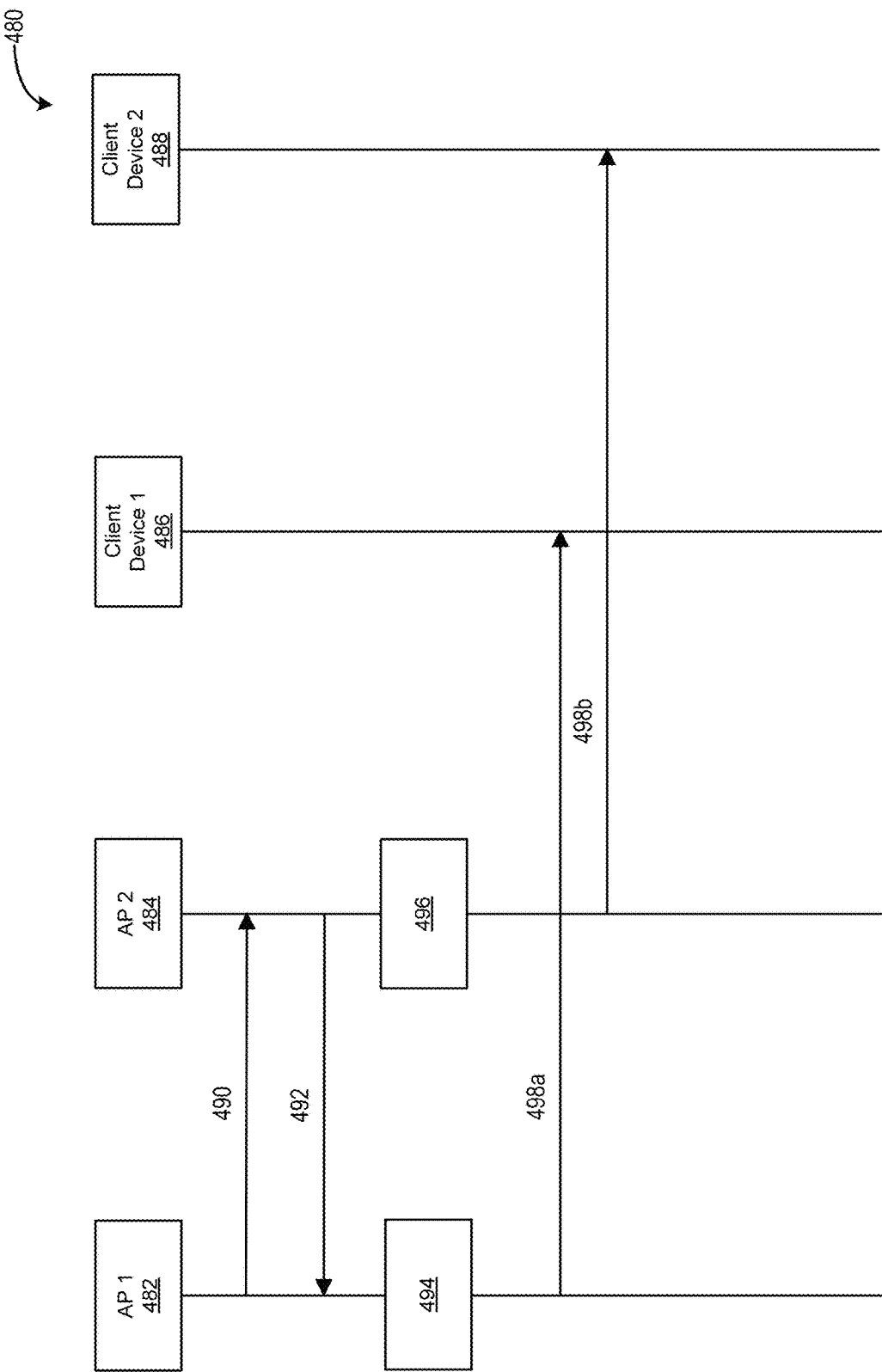

FIG. 4D illustrates an example flow 480 associated with enabling spatial reuse for a mode of transmission. As illustrated in FIG. 4D, the example flow 480 involves a first AP 482, a second AP 484, a first client device 486, and a second client device 488. At step 490, the first AP 482 broadcasts a BSS that allows the second AP 484 to determine that the first AP 482 is using the same channel as the second AP 484. The second AP 484 may also broadcast a BSS that allows the first AP 482 to determine that the second AP 484 is using the same channel as the first AP 482. At step 492, the second AP 484 communicates a spatial reuse policy with the first AP 482. The spatial reuse policy, in this example, can involve enabling spatial reuse for a mode of transmission, such as beamformed transmission. To implement the spatial reuse policy, the first AP 482 and the second AP 484 will enable spatial reuse for beamformed transmissions, which can be identified from a preamble or a header of a frame. At step 494, the first AP 482 can receive a first data frame associated with a beamformed transmission. At step 496, the second AP 484 can receive a second data frame associated with a beamformed transmission. At step 498a, the first AP 482 can transmit the first data frame with spatial reuse enabled. At step 498b, the second AP 484 can transmit the second data frame, in parallel with the first data frame, with spatial reuse enabled. Spatial reuse can be enabled for data originating from an AP or a client device (or other network devices). This example illustrates the first AP and the second AP transmitting the first data frame and the second data frame in parallel with spatial reuse enabled. In other examples, the first client device and the second client device can transmit data frames in parallel with spatial reuse enabled. Further, an AP and a client device can transmit data frames in parallel with spatial reuse enabled.

Figure 5:
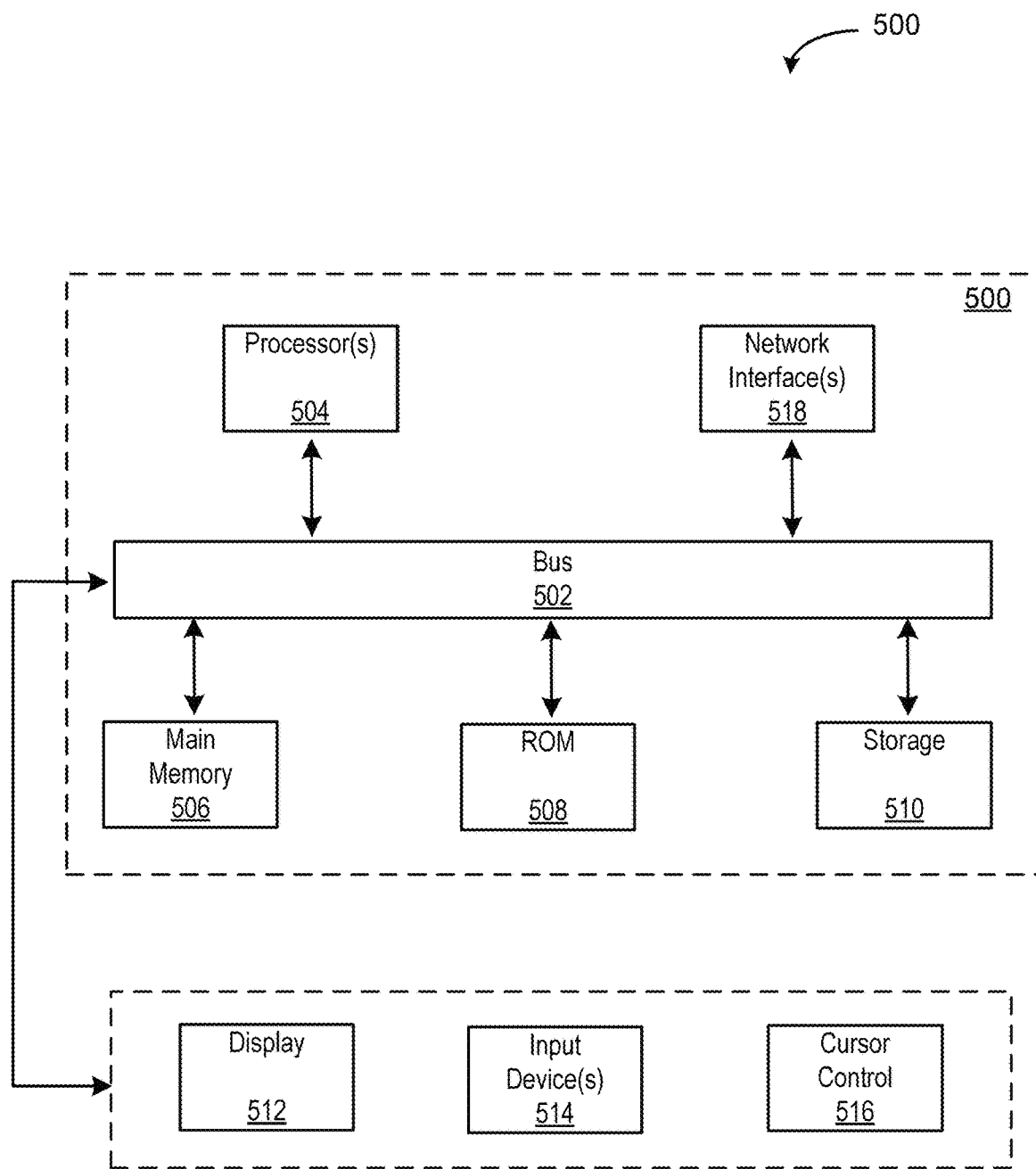
FIG. 5 is an example computing component that may be used to implement various features of embodiments described in the present disclosure.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic, or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the worldwide packet data communication network now commonly referred to as the "Internet." Local network and Internet both use electrical, electromagnetic, or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network, and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
    determining, by a first access point (AP), a second AP on a channel shared with the first AP based on a basic service set (BSS) transmitted by the second AP;
    determining, by the first AP, one or more factors associated with the channel, wherein the one or more factors includes channel utilization;
    determining, by the first AP, a spatial reuse policy based on the one or more factors associated with the channel; and
    transmitting, by the first AP, a data frame based on the spatial reuse policy;
    wherein the spatial reuse policy involves at least one of:
        enabling spatial reuse for downlink traffic, wherein spatial reuse is enabled for transmissions from the first AP, and wherein spatial reuse is disabled for transmissions from a client device associated with the first AP,
        enabling spatial reuse for uplink traffic, wherein spatial reuse is disabled for transmissions from the first AP, and wherein spatial reuse is enabled for transmissions from a client device associated with the first AP,
        disabling spatial reuse for multicast transmission, wherein spatial reuse is disabled for a period of time associated with the multicast transmission, and
        enabling spatial reuse based on a mode of transmission, wherein spatial reuse is enabled based on a preamble associated with the data frame, and wherein the preamble indicates the mode of transmission associated with the data frame.

2. The method of claim 1, wherein the spatial reuse policy involves a threshold channel utilization range, wherein spatial reuse is enabled for the channel if the channel utilization is within the threshold channel utilization range, and wherein spatial reuse is disabled for the channel if the channel utilization is outside the threshold channel utilization range.

3. The method of claim 1, wherein the channel utilization is based on an amount of traffic on the channel and a capacity of the channel.

4. The method of claim 1, wherein the spatial reuse policy is communicated with the first AP and the second AP based on an out-of-band mechanism.

5. A system, comprising:
    a processor; and
    a memory operatively connected to the processor, and including computer code that when executed, causes the system to:
        determine an access point (AP) on a channel shared with the system based on a basic service set (BSS) transmitted by the AP;
        determine one or more factors associated with the channel;
        determine a spatial reuse policy based on the one or more factors associated with the channel, wherein the spatial reuse policy involves enabling spatial reuse for downlink traffic;
        communicate the spatial reuse policy with the AP; and
        at least one of:
            broadcast to client devices that spatial reuse is disabled for the channel, and
            communicate with the AP that spatial reuse is enabled for transmissions from the AP.

6. The system of claim 5, wherein the spatial reuse policy involves a threshold channel utilization range, wherein spatial reuse is enabled for the channel if a channel utilization of the channel is within the threshold channel utilization range, and wherein spatial reuse is disabled for the channel if the channel utilization is outside the threshold channel utilization range.

7. The system of claim 5, wherein the spatial reuse policy involves disabling spatial reuse for multicast transmission, wherein spatial reuse is disabled for a period of time associated with the multicast transmission.

8. The system of claim 5, wherein the spatial reuse policy involves enabling spatial reuse based on a mode of transmission, wherein spatial reuse is enabled based on a preamble associated with the data frame, and wherein the preamble indicates the mode of transmission associated with the data frame.

9. A non-transitory computer-readable storage medium including instructions that, when executed by at least one processor of a computing system, cause the computing system to:
 determine an access point (AP) on a channel shared with the system based on a basic service set (BSS) transmitted by the AP;
 determine one or more factors associated with the channel;
 determine a spatial reuse policy based on the one or more factors associated with the channel, wherein the spatial reuse policy involves enabling spatial reuse for uplink traffic;
 communicate the spatial reuse policy with the AP; and
 at least one of:
  broadcast to client devices that spatial reuse is enabled for the channel, and
  communicate with the AP that spatial reuse is disabled for transmissions from the AP.

10. The non-transitory computer-readable storage medium of claim 9, wherein the spatial reuse policy involves a threshold channel utilization range, wherein spatial reuse is enabled for the channel if a channel utilization of the channel is within the threshold channel utilization range, and wherein spatial reuse is disabled for the channel if the channel utilization is outside the threshold channel utilization range.

11. The non-transitory computer-readable storage medium of claim 9, wherein the spatial reuse policy involves disabling spatial reuse for multicast transmission, wherein spatial reuse is disabled for a period of time associated with the multicast transmission.

12. The non-transitory computer-readable storage medium of claim 9, wherein the spatial reuse policy involves enabling spatial reuse based on a mode of transmission, wherein spatial reuse is enabled based on a preamble associated with the data frame, and wherein the preamble indicates the mode of transmission associated with the data frame.

13. The method of claim 1, further comprising:
 broadcasting to client devices that spatial reuse is enabled for the channel.

14. The system of claim 5, wherein:
 spatial reuse is enabled for transmissions from the AP;
 spatial reuse is disabled for transmissions from a client device associated with the AP.

15. The non-transitory computer-readable storage medium of claim 9, wherein:
 spatial reuse is disabled for transmissions from the AP; and
 spatial reuse is enabled for transmissions from a client device associated with the AP.

* * * * *